UNITED STATES PATENT OFFICE.

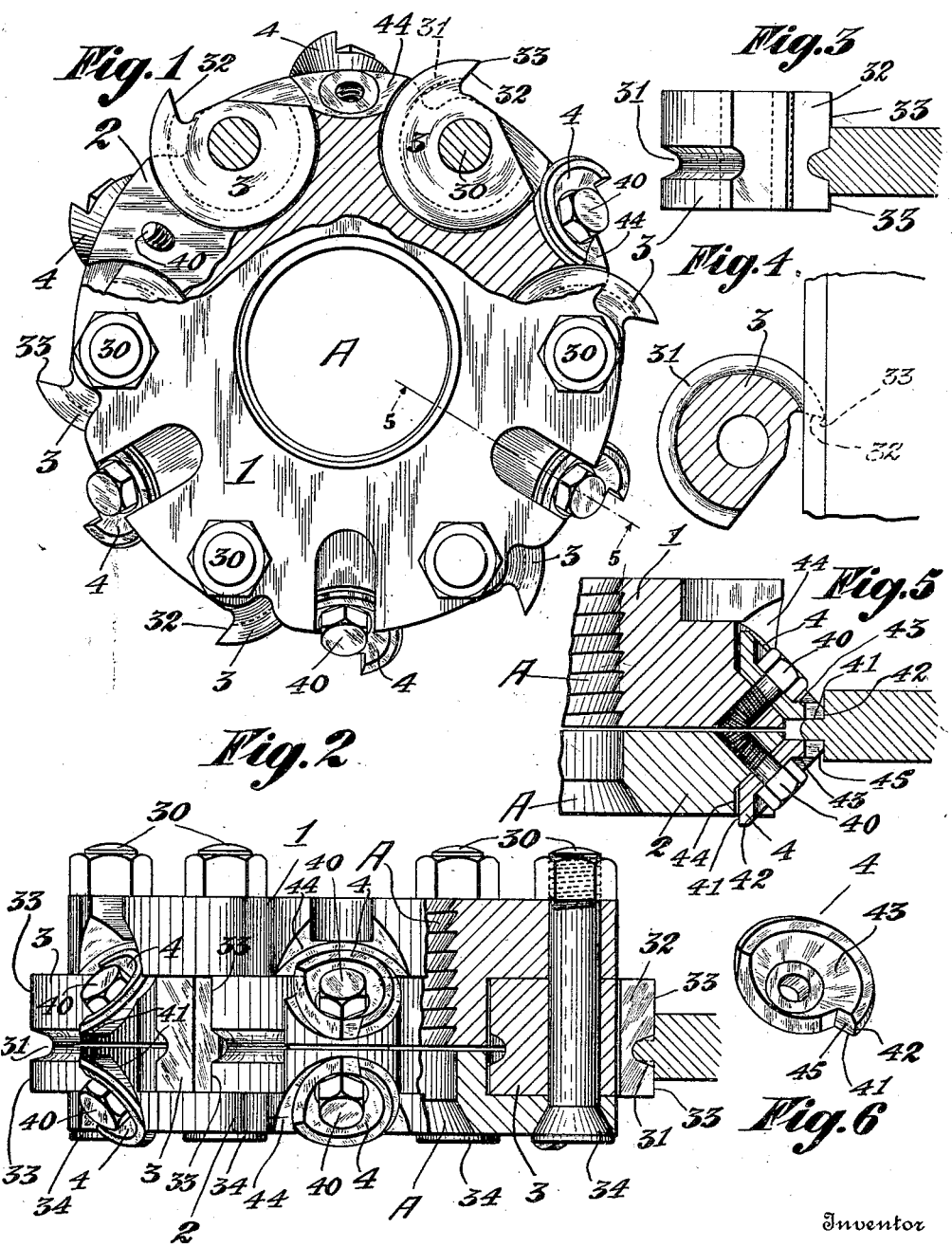

EDWARD H. WAUGH, OF SEATTLE, WASHINGTON.

CUTTER-HEAD.

1,137,937.  Specification of Letters Patent.  Patented May 4, 1915.

Application filed January 27, 1915. Serial No. 4,774.

*To all whom it may concern:*

Be it known that I, EDWARD H. WAUGH, a citizen of the United States of America, and a resident of the city of Seattle, in the county of King and State of Washington, have invented certain new and useful Improvements in Cutter-Heads, of which the following is a specification.

My invention relates to cutter heads of the type used in dressing lumber, and is shown particularly as designed for use in forming the tongue on the edge of a board, as is done in connection with flooring or other lumber that it is designed shall be joined together throughout the length of their edges.

The object of my invention is to provide a cutter head having thereon detachable and adjustable cutters, these being capable of such adjustment that they may be provided with keen cutting edges and with shape and clearness such as they may be able to make a smooth cut on lumber of a difficult character of work.

Other objects of my invention will appear from a consideration of the specification and the claims terminating the same.

The particular feature which I claim as my invention will be defined in the claims.

In the accompanying drawings I have shown my invention in the form of construction which is now preferred by me.

Figure 1 is a face view of my cutter head with a portion of one side broken away to more clearly show the position and relation of the cutters. Fig. 2 is an edge view of the cutter head with a segment cut therefrom. Fig. 3 is a face view of one of the adjustable cutters showing therewith a section of a piece of lumber and illustrating the shape of tongue formed by this set of cutters. Fig. 4 is a transverse section through the same type of cutters taken in the plane passing through the bottom of the groove, a section of lumber being shown therewith. Fig. 5 is a section taken on the line 5—5 of Fig. 1; and Fig. 6 is a perspective of one of the other set of cutters detached from the head.

The supporting body of the cutter head is composed of two parts, 1 and 2, which are separated upon a plane which is substantially perpendicular to the axis of the cutter head. These parts, as herein shown, are in the form of two disks of unequal thickness, each being provided with suitable recesses and bores for the reception of cutters and bolts by which the parts and the cutters are secured together. Each of these parts is provided with a central bore, as A, shown in Fig. 1, for the reception of a spindle upon which it is mounted. The manner of securing this upon the spindle, forming no part of my present invention, need not be described.

The cutters 3, which form one set, are of cylindrical outline except that they are provided with a peripheral groove or grooves, as 31, which will form the preliminary shape of the tongue required, and also are provided with such notches or cut-away sections as may be necessary to form the cutting edges. These cut-away sections are clearly shown in Figs. 1 and 4. The cutting away of these sections forms in each cutter, a face 32, which approximates fairly close to a radial plane, but should depart therefrom so as to make the angle at the cutting edge 33 an acute angle. This is necessary only for the purpose of forming a keener and smoother cutting edge and also for the purpose of providing a satisfactory clearance just back of the cutting edge. This type of cutter may be sharpened by only grinding back the face 32. The two parts 1 and 2, which form the body of the head, are provided with recesses in their opposed faces, of such size as to receive the cutters 3. This recessing is clearly shown in Figs. 1 and 2. They are also provided with bores concentric with these recesses through which pass clamping bolts 30, which also serve as the axes of the cutters 3. The head of the bolt 34 is preferably coned, and the bore, through the outer part 2 of the head, is countersunk to correspond. The thickness of the cutters 3 should slightly exceed the combined depth of the recesses in both parts of the head, within which it is placed, so as to maintain a slight clearance between the parts 1 and 2. This permits the use of cutters of slightly varying thicknesses and also provides a means, by the use of interposed shims, by which the amount of separation of the other set of cutters may be adjusted.

The other set of cutters, of which one is shown in perspective in Fig. 6, is made in the form of a truncated cone or cones. The cross-section of these cutters, shown in Fig. 5, will clearly illustrate their general shape. The exterior conical surface 41 has its apex in one direction while the edges of the cutters are ground to form a slight frustum of a cone 42, which has its apex in the other direction, the bases of these two cones being coincident. To better recess the head of the securing bolt 40, the outer face of these cutters may be recessed by hollowing them out, this forming a third conical surface 43.

These cutters have a portion of one side cut away so as to form a cutting tooth 45. This extends through a material segment of the circle. Each of the parts 1 and 2 of the head are provided with recesses for the reception of the cutters 4. These recesses 44, are spaced in alternate relation with the recesses, which receive the cutters 3 and have their inner or seating surface placed with its axis at an angle with the rotative axis of the head. Their position relative to the axis of the head is clearly shown in Fig. 5, in which view their axes are placed at 45° angle with the axes of the head, these axes intersecting the axis of the head and being placed in reversed position for the two heads. The angular position of these axes depends upon the angle employed in making the cutters 4 and should be such that, when the cutter is secured in the recess, the cutting edges, as 41 and 42, will correspond in position to the finished surfaces of the lumber being cut thereby. In the illustration, as shown, these surfaces are respectively perpendicular and parallel to the axis of the head.

The cutting face 45 of these cutters, should consist of a plane which extends to one side of the axis of the cutter, so that the edges 41 and 42, which do the actual cutting, will form acute angles, and for the further purpose of providing clearance for the body of the cutter immediately back of these cutting edges. By adjusting the angular position of these cutters relative to the bolts 40, by which they are secured, a slight variation in the separation of the cutting edges of each pair of cutters may be obtained. This variation is slight, but is only intended to cover slight adjustments. Should a larger adjustment be required, this may be obtained by employing shims in connection with the cutters 32, which would thereby increase the separation between the parts 1 and 2 of the head. The cutters 4 are arranged in pairs and placed opposite each other and between the positions occupied by the cutters 3.

In working some varieties of timber, great difficulty is found in securing a smooth finished surface with the ordinary cutter. The fiber of the wood seems to be of such character that an ordinary cutter will produce a fuzzy surface. This is particularly true of some sorts of pine, which is naturally of a somewhat inferior quality. I have found that the type of cutter herein described, which is provided with positive clearance and with a relatively sharp or acute angled edge, will produce a much superior surface when working such grades of lumber, particularly where, as in this case, one set of cutters is provided which roughly shapes out the edge and another set which removes but little stock and surface to make the finish cut. The relation between the rough cut and the finish cut is shown in the cross section of the board in connection with Fig. 2. The finish cut is indicated by the dotted lines.

Having thus described my invention, what I claim as new, and desire to secure by Letters Patent of the United States of America, is:—

1. A cutter head having a series of cutters mounted for rotative adjustment upon axes which are inclined to the axis of the head and having conical outer surfaces and notched to form cutting faces and chip-clearance.

2. A cutter head having a series of cutters mounted for rotative adjustment upon axes which are inclined to the rotative axis of the head and having double conical outer surfaces, the bases of said cones being together, said cutters being notched or cut across to form cutting faces which include portions of both of said cones.

3. A cutter head having a body composed of two parts which are relatively adjustable in the direction of their axis of rotation, a series of cutters mounted upon each of said body parts upon axes which are inclined to the axis of rotation of the head and rotatively adjustable upon their axes, the surfaces of said cutters which constitute their cutting edges being conical and concentric with their axes.

4. A cutter head having a series of turned cutters mounted for rotative adjustment upon axes which are parallel with the rotative axes of the head, and a series of turned cutters mounted for rotative adjustment upon axes which are inclined in planes which are substantially radial to the rotative axis of the head.

5. A cutter head having a series of cutters mounted for rotative adjustment upon axes which are parallel with the rotative axis of the cutter head and having outer surfaces which are concentric with their axes, indented to form the cutting edges and chip-clearance, and a series of cutters mounted for rotative adjustment upon axes which are inclined to the rotative axis of the head and which lie in planes which are substantially axial of the head, said cutters having conical exterior surfaces which lie in planes which are substantially perpendicular to the axis of the head and being notched to form cutting faces and chip-clearance.

6. A cutter head having a body composed of two parts separating upon a plane which is substantially perpendicular to its axis of rotation, each part being provided with circular recesses in their inner or opposed faces, which recesses are intersected by the outer periphery of the body parts and each register with the like recess of its companion part, cutters fitting said recesses and serving as spacers between the parts of the head, said cutters and the head-body parts having alining bolt receiving holes, clamping bolts passing through said cutters and body parts, a supplemental set of cutters of conical outline of cutting surfaces, and means for mounting said cutters on the periphery of said body parts with the axes of their cones in diagonal position relative to the axis of rotation of the cutter head.

7. A cutter head having a body composed of two parts separating upon a plane which is substantially perpendicular to its axis of rotation, each part being provided with circular recesses in their inner or opposed faces, which recesses are intersected by the outer periphery of the body parts and each register with the like recess of its companion part, cutters fitting said recesses and serving as spacers between the parts of the head, said cutters and the head-body parts having alining bolt receiving holes, clamping bolts passing through said cutters and body parts, both of said body parts having cutter-receiving recesses located between the aforementioned recesses and with their axes inclined to the axis of the cutter head, and cutters seating in said last mentioned recesses and having conical surfaces cut across to form cutting edges.

Signed at Seattle, Washington this 20th day of January 1915.

EDWARD H. WAUGH.

Witnesses:
E. ARLITA ADAMS,
CLARA A. HARM.

Copies of this patent may be obtained for five cents each, by addressing the "Commissioner of Patents, Washington, D. C."